(No Model.)
P. B. BRAZEL.
SNOW PLOW.
No. 298,441. Patented May 13, 1884.
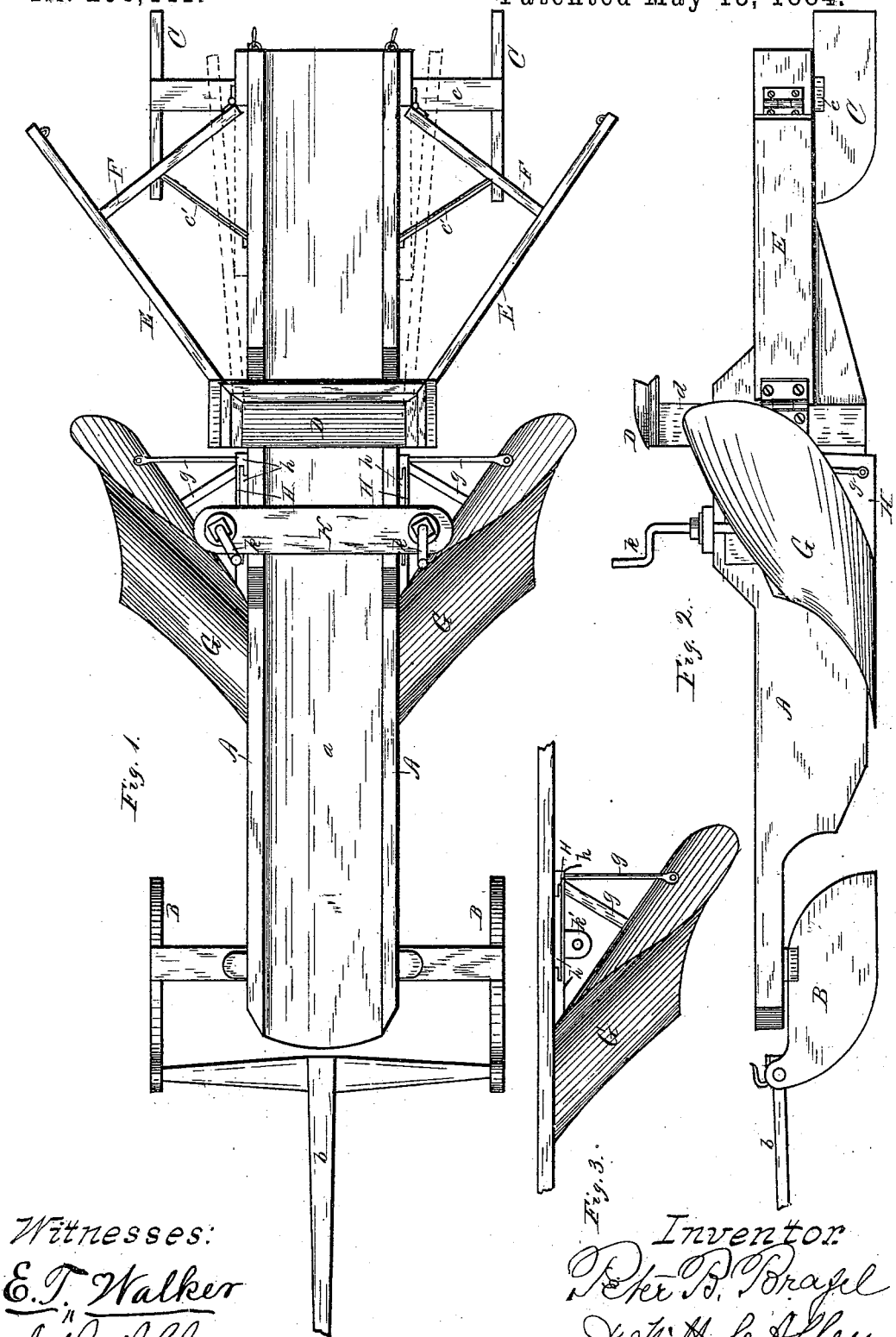
Witnesses:
E. T. Walker
A. L. Allen
Inventor
Peter B. Brazel
DeWitt C. Allen,
atty

UNITED STATES PATENT OFFICE.

PETER BRADFORD BRAZEL, OF CHEBOYGAN, MICHIGAN.

SNOW-PLOW.

SPECIFICATION forming part of Letters Patent No. 298,441, dated May 13, 1884.

Application filed January 24, 1884. (No model.)

*To all whom it may concern:*

Be it known that I, PETER BRADFORD BRAZEL, a citizen of the United States, residing at Cheboygan, in the county of Cheboygan and State of Michigan, have invented certain new and useful Improvements in Snow-Plows; and I do hereby declare the following to be a full, clear, and exact description of the invention, such as will enable others skilled in the art to which it appertains to make and use the same.

This invention relates to certain new and useful improvements in snow-plows adapted to be drawn by horses, and having a frame provided with adjustable diverging wings and vertically-adjustable plows; and the invention consists in novel features of construction and combination and arrangement of parts, all as will be hereinafter fully described, and set forth in the claims hereto annexed.

Referring to the accompanying drawings, Figure 1 represents a top view or plan of my improved plow; Fig. 2, a side elevation; Fig. 3, a detached sectional view of a portion of the main frame and one of the plows connected thereto.

In the drawings, A A represent longitudinal beams connected together by cross-bars, (not shown,) upon which rests the bottom board, $a$, said beams and cross-bars forming the main frame of the plow, and to which the operating parts thereof are secured. This plow or main frame is supported in front by runners B, connected together and pivotally connected to said main frame, and to said runners B B is pivotally connected the usual pole or tongue, $b$. The rear end of said plow or main frame is supported upon the cross-bar $c$, connecting the runners C C, which runners are also rigidly connected to the side beams, A A, by diagonal braces $c'$ $c'$.

D represents the driver's seat, supported above the plow or main frame by vertical uprights $d$ $d$, secured to the side beams of said frame.

E E are diverging wings, pivoted or hinged at their forward ends to the seat-supports $d$ $d$ on opposite sides of the beams A A, and adjustably connected at their rear ends, in any suitable manner, to the bars F F, projecting outwardly from said beams A A, to which they are hinged, said wings being adjusted outward to prepare a road of any desired width.

G G represent the usual mold-board plows, connected to the outside of the beams A A by vertical plates H H, adapted to be vertically adjusted in metallic guideways $h$ $h$, secured to the side beams, A A, the plows being braced by reverse inclined bars or rods $g$ $g$. These plates H H are connected by screw rods and nuts $k$ $k'$ to a cross-bar, K, arranged in front of the driver's seat, and by turning said screw-rods the plows are adapted to be vertically adjusted to regulate the depth the plows and wings may enter the snow.

The above-described snow-plow combines simplicity and durability in construction, and which can be easily and readily operated to form a path or roadway of any desired width or depth.

Having thus fully described my invention, what I claim as new, and desire to secure by Letters Patent, is—

1. The combination, with the plow-frame or main frame and the supporting-runners, of the adjustable plows G, the adjustable pivoted wings E, and hinged bars F, substantially as and for the purpose set forth.

2. The combination, with the side beams, A A, of the metallic guideways $h$ $h$, connected thereto, the plates H H, provided with the plows G G, the cross-bar K, and screw rods and nuts $k$ $k'$, substantially as and for the purpose specified.

In testimony whereof I affix my signature in presence of two witnesses.

PETER BRADFORD BRAZEL.

Witnesses:
E. Z. PERKINS,
HENRY W. MCARTHUR.